United States Patent [19]

Soderberg

[11] Patent Number: 5,507,469
[45] Date of Patent: Apr. 16, 1996

[54] VALVE ACTUATOR SYSTEM FOR INITIAL TORQUE REDUCTION

[75] Inventor: Paul B. Soderberg, Montgomery, Tex.

[73] Assignee: Soderberg Research & Development, Inc., Montgomery, Tex.

[21] Appl. No.: 434,038

[22] Filed: May 2, 1995

[51] Int. Cl.⁶ ..................................... F16K 31/53
[52] U.S. Cl. .................. 251/248; 74/89.18; 251/250.5
[58] Field of Search .................... 74/89.18, 431, 74/433, 434, 435; 251/248, 249.5, 250, 250.5

[56] References Cited

U.S. PATENT DOCUMENTS

| | | | |
|---|---|---|---|
| 1,219,392 | 3/1917 | Hagen | 251/250.5 |
| 1,797,490 | 3/1931 | Wilson | 251/250.5 |
| 2,024,823 | 12/1935 | Jones | 251/250.5 |
| 2,064,765 | 12/1936 | Powell et al. | 251/250.5 |
| 2,574,080 | 11/1951 | Wilson | 251/250.5 |
| 2,690,894 | 10/1954 | Blevans | 251/250.5 |
| 2,983,479 | 5/1961 | Thomas | 74/89.18 |
| 4,962,911 | 10/1990 | Soderberg | 251/159 |
| 5,333,834 | 8/1994 | Soderberg | 251/86 |

Primary Examiner—George L. Walton
Attorney, Agent, or Firm—Browning, Bushman, Anderson & Brookhart

[57] ABSTRACT

A system for reducing the initial force required to actuate a valve, preferably a rotary valve, from its fully closed position is disclosed. The system comprises an operating arm fixed to and rotatable with the valve stem. Disposed and rotatable about, but not fixed to, the valve stem is a spur gear with an operating lever affixed thereto. The force applied to the operating lever is transferred to the operating arm through a gear sector carried on the operating arm. During the initial actuation, the gear sector engages with and rotates about a latch pin to increase the force applied to the operating arm by the operating lever. During the remainder of the actuating movement, the gear sector is fixed relative to the operating arm so that the force applied to the operating lever is transmitted to the operating arm without any increase in force.

20 Claims, 7 Drawing Sheets

VALVE ACTUATOR SYSTEM FOR INITIAL TORQUE REDUCTION

BACKGROUND OF THE INVENTION

1. Field of the Invention

The present invention generally relates to systems for reducing the initial force required to actuate a valve from the fully closed position. More specifically, the present invention is directed to a system to provide easier actuation of high pressure rotary valves, e.g., my HEMIWEDGE™ valve described in U.S. Pat. No. 4,962.911 incorporated by reference herein.

2. Description of the Background

It is well known that the force required to initially open or completely close a valve is much greater than the force required to increase or decrease the opening of an already opened valve. When frilly closed, in addition to friction between contact surfaces of the valve seat and valve element, the initial opening force must overcome the pressure differential across the valve. Once the valve has been opened, adjustment of the valve is much easier because neither the friction nor pressure differential is present.

In high pressure pipelines, the operating force required to initially open a valve is substantially more than the force required to alter the valve opening. With hand operated valves employing an operating lever, this greater initial force may be applied by extending the length of the operating lever. In simple operations, this may be accomplished by using a longer operating lever or by placing a cheater pipe over the operating lever to extend its length. However, the use of long operating levers or cheater pipes may not be practical in many situations. For example, this solution may be unacceptable in confined or close quarters. Nor is it generally applicable where the operating lever comprises a circular handle. Nor is it generally applicable where the valve is operated by an electrical, pneumatic, hydraulic or other automatic actuator. Because much less force is required for later valve adjustment, the size of automatic actuators has been determined by the initial opening force required. Therefore, it has been necessary to employ an automatic actuator much larger than would have been required for most operations of the valve.

The development and introduction of the HEMIWEDGE™ valve has greatly exacerbated this problem. The HEMIWEDGE™ valve and a driver therefore are described and claimed in my U.S. Pat. Nos. 4,962,911 and 5,333,834, both of which are incorporated by reference herein. Because of its compact design, the HEMIWEDGE™ valve is particularly adaptable for use in high pressure pipelines in restricted access areas. Accordingly, the problem of producing the greater force required to initially actuate a rotary valve from its fully closed position became more apparent with use of the HEMIWEDGE™ valve. An improved actuator system was required which was capable of developing the greater force required to initially open the HEMIWEDGE™ and other rotary valves using a conventional, manual or automatic actuator.

There has been a long felt but unfulfilled need in the industry for an efficient means for reducing the force required to initially operate a valve by increasing the force which must be applied during the initial opening of the valve. The present invention solves that need.

SUMMARY OF THE INVENTION

The present invention is directed to a system for reducing the initial force required to actuate a valve from its fully closed position. This system may be conveniently installed on the valve housing and the projecting valve stem of any valve. This system is particularly useful with rotary valves, i.e., the HEMIWEDGE™ valve described and claimed in U.S. Pat. No. 4,962,911.

In its broadest embodiment, the system comprises an operating arm fixed to and rotatable with the valve stem. Disposed and rotatable about, but not fixed to, the valve stem is a spur gear. An operating lever is affixed to the spur gear. The force applied to the operating lever and spur gear is transferred to the operating arm to rotate the valve stem by a transfer means having first and second positions. In the first position the force is multiplied during the transfer between the operating lever and the operating arm while in the second position the force is transferred directly from the operating lever to the operating arm. The first position provides the multiplied force required for initially actuating the valve from the fully closed position. The second position directly applies the lower operating force to the valve after the resistance to initial opening has been overcome. Finally, the system includes means for moving and locking the transfer means between the first and second positions.

In the presently preferred embodiments the transfer means comprises a gear sector carded on the operating arm. The gear sector is defined by an arc having gear teeth for engaging the spur gear and two radial sides connecting the arc with a short opposite side. The gear sector is pivotable on the short opposite side about a latch pin fixed to the valve housing. The gear sector is connected with the operating arm so that rotation of the gear sector about the latch pin rotates the operating arm about the valve stem. The operating force applied to the operating lever is increased by a factor determined by the distances between the operating arm, the latch pin and the gear sector, together with the gear ratio of the gear sector and spur gear, during that portion of the actuating movement when the gear sector rotates about the latch pin.

In the presently most preferred embodiment, the locking means comprises cooperating stops on the gear sector and spur gear together with a slidable key disposed in a keyway formed between the operating arm and the gear sector. This locking means locks the gear sector and operating arm in a fixed relative position after the valve initially has been opened a few degrees. This fixed relative position of the gear sector and operating arm is maintained throughout the remaining operating range of the valve. In this fixed relative portion the force applied to the operating lever is transferred directly to the valve stem without any increase in force.

The present invention provides a system for reducing the initial force required to actuate a valve by increasing the force applied to the operating arm during the initial opening movement. This system is particularly useful with a rotary valve, e.g., my patented HEMIWEDGE™ valve. This system provides a force multiplier to overcome the friction and high differential pressure of the fully closed valve. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein.

While the invention will be described in connection with the presently preferred embodiments, it will be understood that it is not intended to limit the invention to these embodiments. On the contrary, it is intended to cover all alternatives, modifications and equivalents as may be included in the spirit of the invention as defined in the appended claims.

DETAILED DESCRIPTION OF THE PREFERRED EMBODIMENT

The present invention is directed to a system for reducing the initial force required to actuate a valve, preferably a rotary valve such as my HEMIWEDGE™ valve, from the fully closed position. This system provides a means for increasing the force applied by the operating lever during the initial valve actuation to overcome the friction and high pressure differential across the closed valve element in high pressure applications.

Figure 1:
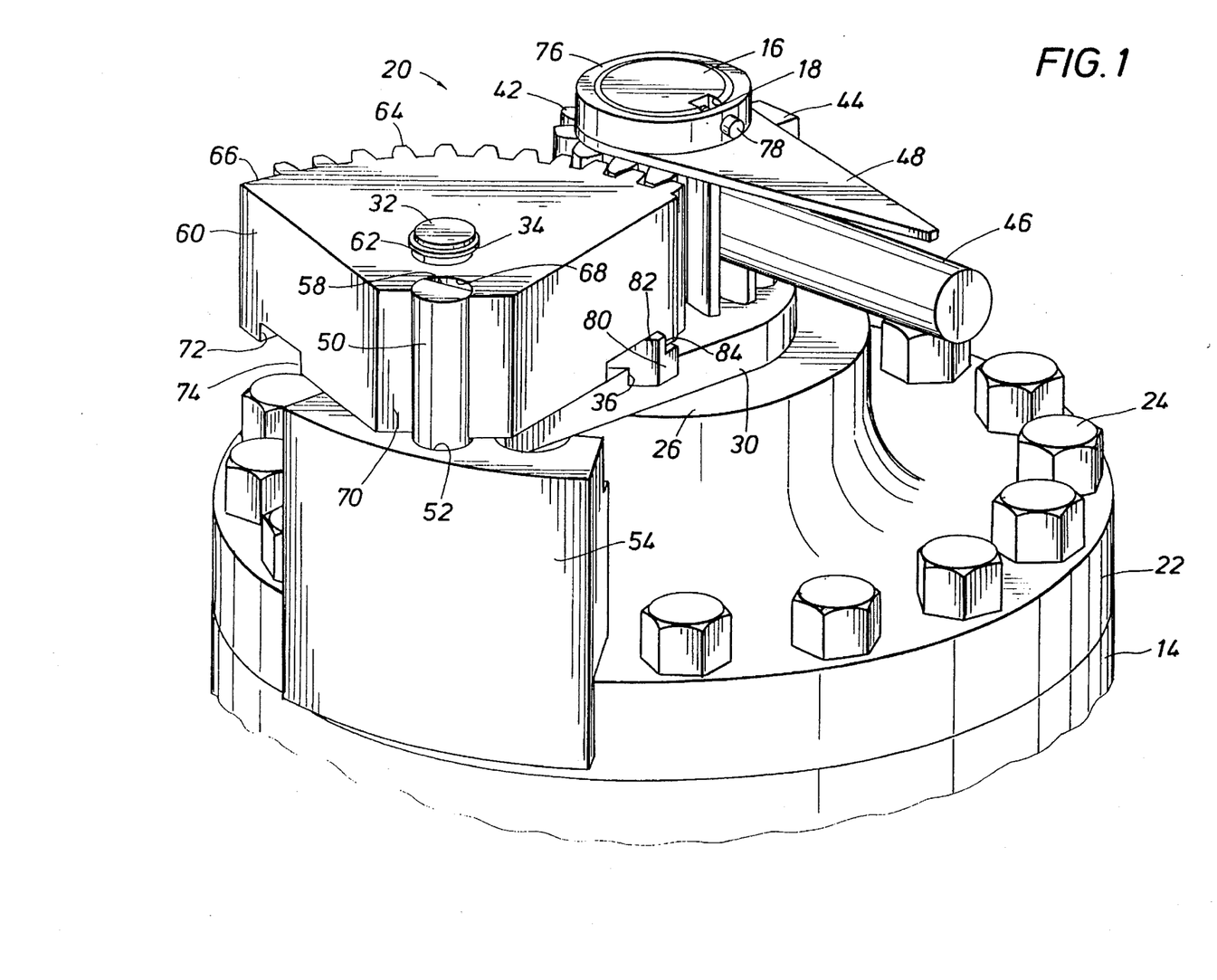
FIG. 1 is a perspective illustration of a valve actuator including a torque reduction system in accord with the present invention as installed on the housing and valve stem of a conventional rotary valve.
Figure 2:
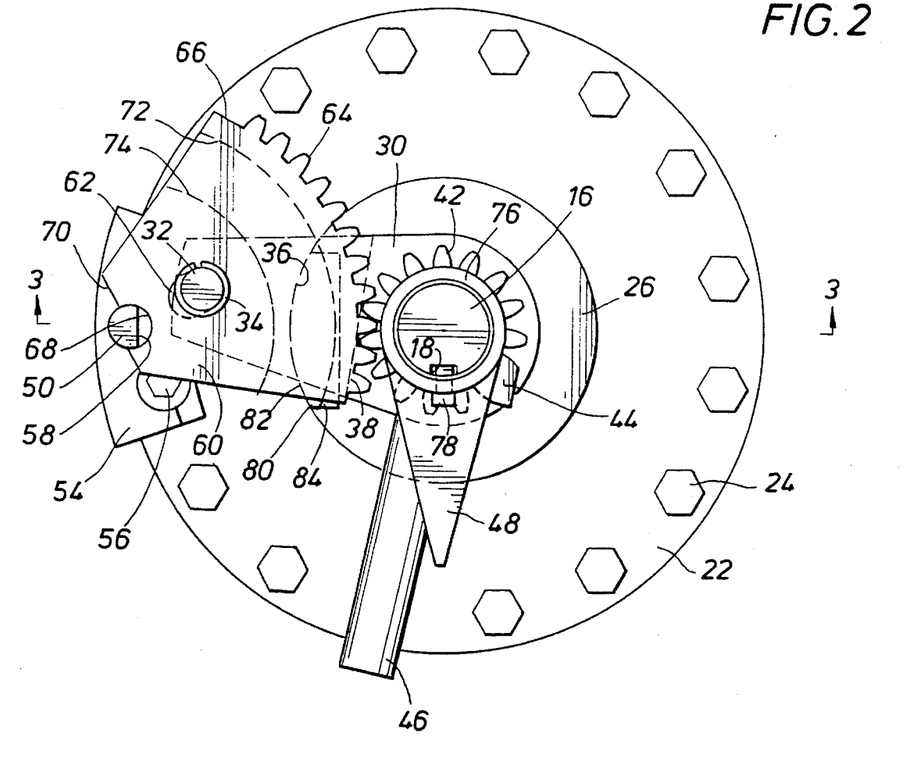
FIG. 2 is a top illustration of the valve actuator including a torque reduction system in accord with the present invention as shown in FIG. 1 and illustrates the system in the fully closed position wherein the gear sector and operating arm are engaged with the latch pin.
Figure 3:
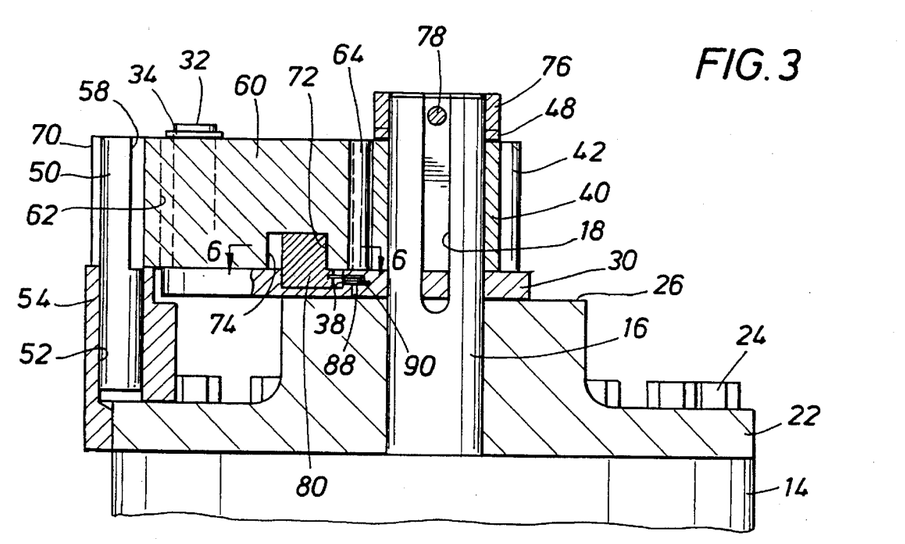
FIG. 3 is a side cross-sectional illustration through line 3—3 of the valve actuator including a torque reduction system in accord with the present invention as shown in FIG. 2.
Figure 4:
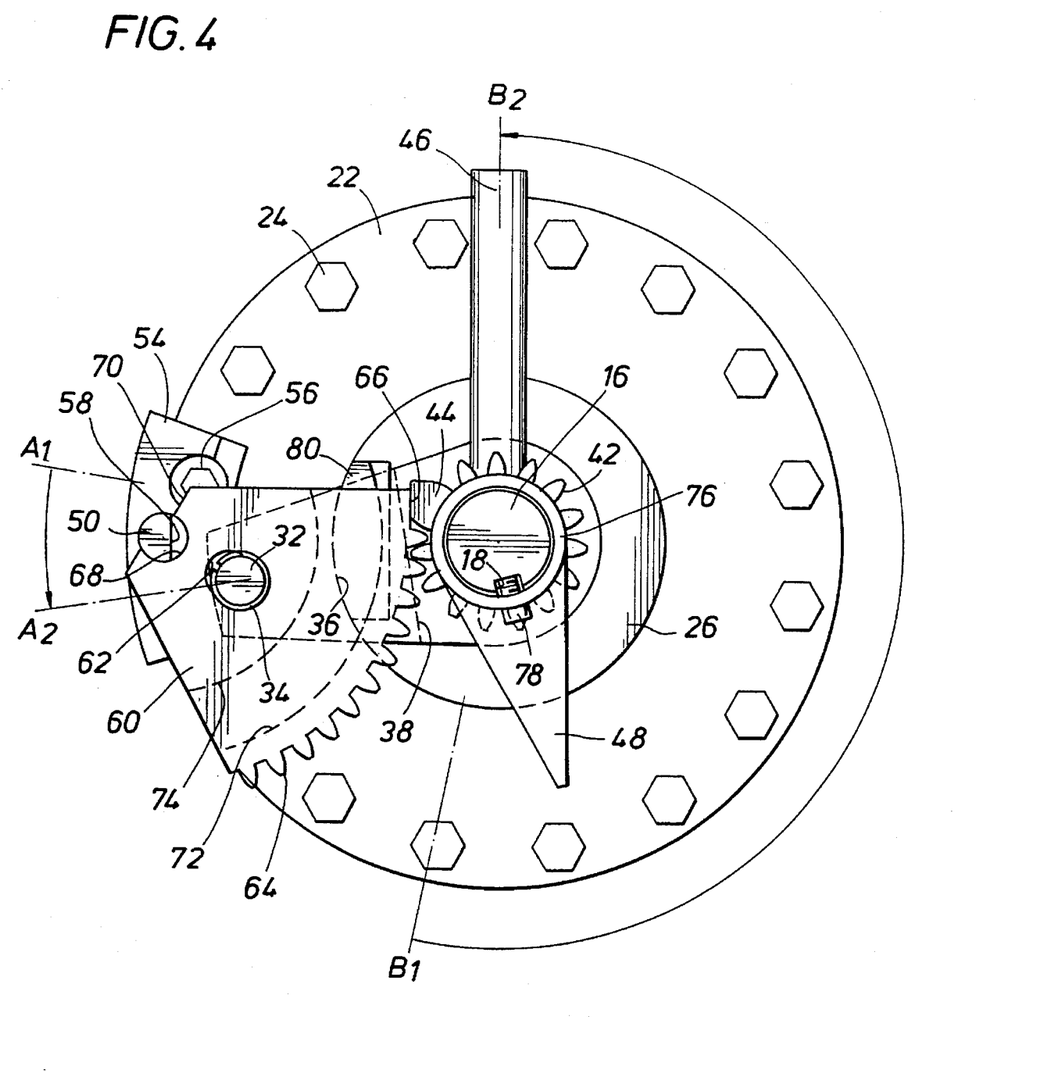
FIG. 4 is a top illustration of the valve actuator including a torque reduction system in accord with the present invention as shown in FIG. 1 and illustrates the system after the valve has been initially opened so that the gear sector has been rotated about the latch pin from the position illustrated in FIG. 2.
Figure 5:
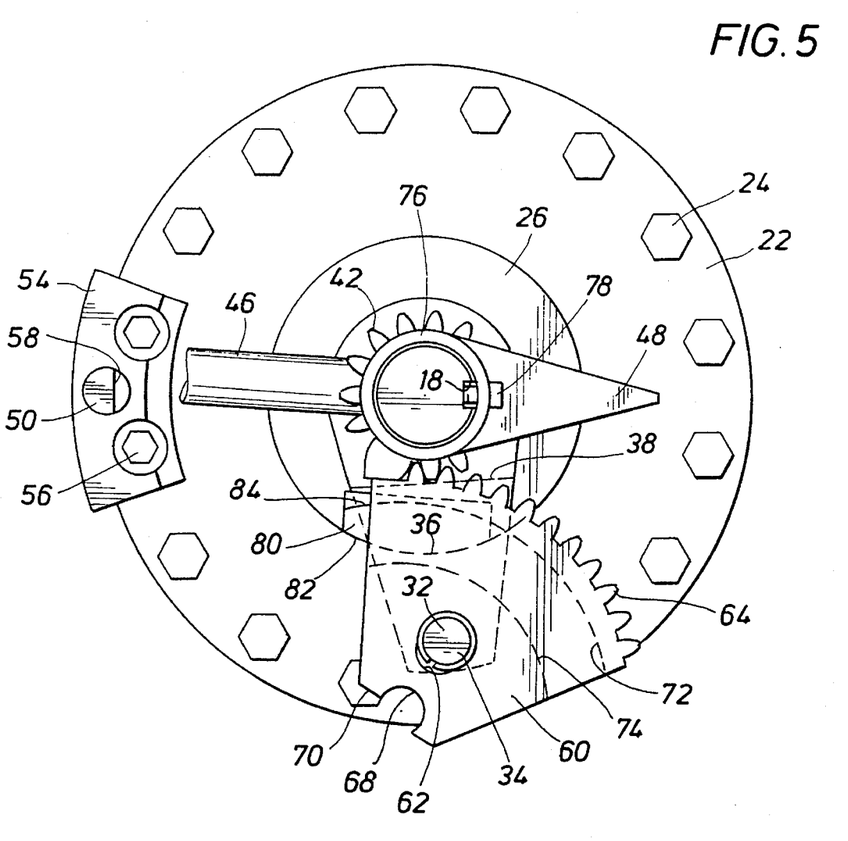
FIG. 5 is a top illustration of the valve actuator including a torque reduction system in accord with the present invention as shown in FIG. 1 and illustrates the system in the fully opened position so that the locked gear sector and operating arm have been rotated away from the latch pin.
Figure 6:
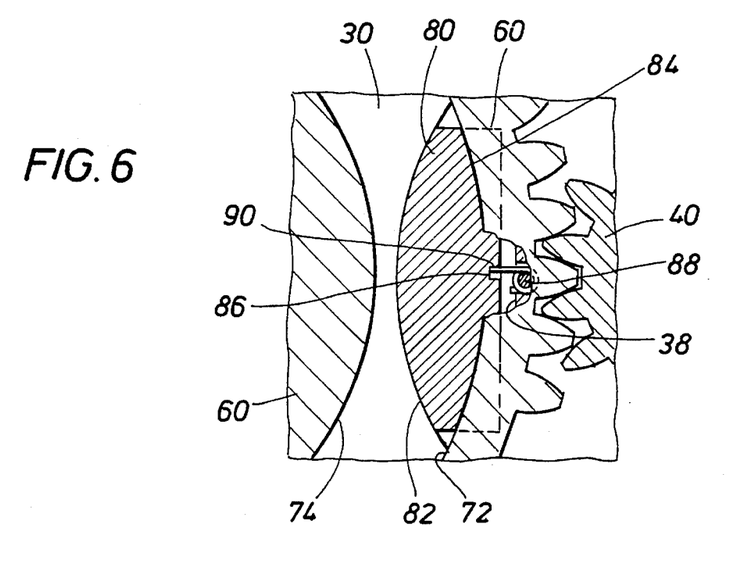
FIG. 6 is a top cross-sectional illustration through the line 6—6 of FIG. 3 illustrating the slidable key and biasing means of the locking means of the torque reduction system in accord with the present invention as shown in FIG. 1.

FIGS. 1–6 illustrate the presently most preferred embodiment of the torque reduction system of the present invention. FIGS. 1–3 illustrate the torque reduction system of the present invention in the fully closed position. FIGS. 4 and 5 illustrate the system, respectively, after the valve has been initially opened and fully opened.

The torque reduction system 20 of the present invention is intended for use with a valve, preferably a rotary valve such as my HEMIWEDGE™ valve disclosed and claimed in my U.S. Pat. No. 4,962,911. In general, these valves include a valve housing 14 within which the valve seat and valve element are disposed. The valve housing 14 is closed by a valve cap 22 held in sealing engagement with the valve housing by a plurality of bolts 24. Projecting from the valve cap 22 is valve stem 16 for actuating the internal valve element.

In the preferred embodiment of the present invention, valve stem 16 includes key 18 extending longitudinally along its external length. In the illustrated embodiment, valve cap 22 includes central upraised portion 26 which might include a conventional stuffing box and upon which operating arm 30 might turn. Operating arm 30 is preferrably keyed to shaft 16 through key 18. While a key arrangement is preferred, operating arm 30 may be affixed to valve stem 16 by any convenient system known to those skilled in the art. The only requirement is that operating arm 30 and valve stem 16 must rotate together. Operating arm 30 includes an upraised pin 32 near its end distal from valve stem 16.

Carried about, but not fixed to, valve stem 16 is spur gear 40 having a plurality of gear teeth 42 thereabout. Also carried on spur gear 40 is an oversized gear tooth providing stop surface 44 which is conveniently placed adjacent operating lever 46 affixed to spur gear 40.

In order to provide a readily recognizable indication of the valve position, i.e., whether the valve is closed or opened and, if open, the approximate degree of opening, a position indicator such as pointer 48 may be carried on valve stem 16. Preferrably pointer 48 is keyed to valve stem 16.

Operating arm 30, spur gear 40 and pointer 48, if used, are conveniently secured in place by mounting ring 76 positioned on the end of valve stem 16 and held in place by set screw 78 which may be fastened into key 18. Spur gear 40 should be separated from operating arm 30 and optional position indicator 48 or mounting ring 76 by appropriate washers or bearings to permit independent rotation about valve stem 16.

Disposed, preferably along the periphery of valve cap 22, is cylindrical latch pin 50. Latch pin 50 is secured in bore 52 of holder 54 in a position substantially parallel to valve stem 16. Holder 54 is conveniently secured to valve cap 22 using bolts 56 in place of the original cap mounting bolts 24.

Carried on operating arm 30 is gear sector 60 having a plurality of gear teeth 64 along its arcuate side for engagement with gear teeth 42 of spur gear 40. In the presently most preferred embodiment illustrated in FIGS. 1–6, the arcuate side of gear sector 60 terminates in flat stop surface 66 for cooperation with stop surface 44 of spur gear 40. The short, opposite side of gear sector 60 includes a cylindrical groove 68 corresponding in size to latch pin 50. The radial sides of gear sector 60 are of a length so that gear sector 60 will pivot along cylindrical groove 68 about latch pin 50 as gear teeth 42 of spur gear 40 turn through gear teeth 64 of gear sector 60. Engagement of stop surfaces 44 and 66 prevents further rotation of gear sector 60 about latch pin 50.

Gear sector 60 includes an elliptical mounting bore 62 for receiving upraised pin 32 of operating arm 30. Thus, movement of gear sector 60, i.e., rotation about latch pin 50 is translated into movement of operating arm 30, i.e., rotation about valve stem 16 via the connection of pin 32 and bore 62. Snap ring 34 is positioned on the end of upraised pin 32 to maintain the connection between gear sector 60 and operating arm 30.

The distance between the centers of valve stem 16, latch pin 50 and upraised pin 32, together with the gear ratio of gear sector 60 and spur gear 40, determine the factor by which the force applied to operating lever 46 is increased. By appropriately setting the gear ratio and distances, any desired force multiplier and thus any desired reduction in the applied force necessary to initially actuate the valve may be achieved to meet specific operating requirements.

The presently most preferred embodiment further includes slidable key 80 disposed in a keyway formed between gear sector 60 and operating arm 30. This keyway is formed by an arcuate groove in the lower surface of gear sector 60. This arcuate groove is characterized by sidewalls 72 and 74, each defined by a radius subtended from the axis of latch pin 50. Also forming this keyway is a cooperating groove in the upper surface of operating arm 30 defined by sidewalls 36 and 38. Sidewall 36 is defined by a radius subtended from the axis of valve stem 16. Sidewalls 74 and 38 merely provide appropriate clearance for key 80. The keyway thus formed between gear sector 60 and operating arm 30 is characterized by oppositely disposed convex surfaces 72 and 36 for receiving therein cooperating slidable key 80. Slidable key 80 includes oppositely disposed, convex faces. Convex face 82 corresponds to and cooperates with sidewall 36 while convex face 84 corresponds and cooperates with sidewall 72. In the presently most preferred embodiment, slidable key 80 is urged toward the unlocked position by spring 90 pressing against wall 86 of slidable key 80. Spring 90 is disposed about pin 88 secured in operating arm 30.

Slidable key 80 cooperates with stop surfaces 44 and 66 to lock and unlock gear sector 60 to operating arm 30. Slidable key 80 can smoothly pass through the keyway constrained by sidewalls 36 and 72 as gear sector 60 rotates about latch pin 50 over operating arm 30. However, key 80 maintains gear sector 60 and operating arm 30 in locked position to prevent relative movement of gear sector 60 and operating arm 30 as the valve is closed by moving from the position illustrated in FIG. 5 to that illustrated in FIG. 4.

The operation of the torque reduction system of the present invention and the cooperation of the various elements is readily understandable by reference to FIGS. 2, 4 and 5 illustrating the components in, respectively, the fully closed, initially opened and fully opened positions of a typical quarter-turn rotary valve. FIG. 2 illustrates the torque reduction system 20 of the present invention in the fully closed position. In the fully closed position operating arm 30 is disposed along radius $A_1$ while operating lever 46 is disposed along radius $B_1$, both subtended from valve stem 16. See FIG. 4. Initial application of force to operating lever 46 in the counterclockwise direction is transmitted through spur gear 40 to gear sector 60. As operating lever 46 is rotated from position $B_1$ to position $B_2$, gear sector 60 is pivoted about latch pin 50, moving operating arm 30 from position $A_1$ to position $A_2$. Thus, while operating lever 46 has rotated approximately 180 degrees, operating arm 30 has rotated only about 20 degrees to initially open the valve. Further rotation of gear sector 60 about latch pin 50 is prevented by engagement of stop surfaces 44 and 66. See FIG. 4. When operating lever 46 is rotated beyond position $B_2$, gear sector 60 and operating arm 30 are rotated in locked position. Gear sector 60 is lifted off latch pin 50 as surface 70 of gear sector 60 clears the flattened face 58 of latch pin 50. Continued rotation of operating lever 46 brings the valve to the fully opened position illustrated in FIG. 5.

The fully opened valve illustrated in FIG. 5 may be closed by rotating operating lever 46 in the clockwise direction. Because slidable key 80 is firmly held within the keyway defined in part by curved sidewalls 36 and 72, gear sector 60 and operating arm 30 remain locked until latch pin 50 is engaged by gear sector 60 in the position illustrated in FIG. 4. Further rotation of operating lever 46 in the clockwise direction causes gear sector 60 to rotate about latch pin 50 during which rotation slidable key 80 is freed to slide through the keyway as gear sector 60 and operating arm 30 rotate from the position illustrated in FIG. 4 to that illustrated in FIG. 2.

The alternative embodiment illustrated in FIGS. 7–11 includes many of the features and components of the preferred embodiment illustrated in FIGS. 1–6. The main difference is in the locking means employed. Instead of employing stop surfaces 44 and 66, together with slidable key 80 as the mechanism to lock operating arm 30 and gear sector 60 in a relative fixed position, the alternative embodiment employs a guide means 190 on gear sector 160 engageable by guide track 180 mounted on valve cap 122.

In the alternative embodiment illustrated in FIGS. 7–10, the torque reduction system of the present invention again is illustrated for use with a conventional rotary valve. The valve housing 114 is closed by valve cap 122 held in sealing engagement with the valve housing by a plurality of bolts 124. Projecting from valve cap 122 is valve stem 116 for actuating the internal valve element.

In the alternative embodiment of the present invention, valve stem 116 includes key 118 extending longitudinally along its external length. In the alternative embodiment, valve cap 122 includes a central upraised portion 126 for housing a conventional stuffing box and upon which operating arm 130 might turn. Operating arm 130 is preferably keyed to shaft 116 through key 118. Operating arm 130 includes near its end distal from shaft 116 an upraised pin 132.

Carried about, but not fixed to, shaft 116 is spur gear 140 having a plurality of gear teeth 142 thereabout. Affixed to spur gear 140 is operating lever 146. Also disposed about, and preferably keyed to, valve shaft 116 is position indicator 148. Finally, cap lock 176 is threaded about valve stem 116.

Disposed, preferably along the periphery of valve cap 122, is cylindrical latch pin 150. Latch pin 150 is secured in bore 152 of holder 154 in a position substantially parallel to valve stem 116. Holder 154 is conveniently secured to valve cap 122 using bolts 156 in place of the original cap mounting bolts 124.

Carded on operating arm 130 is gear sector 160 having a plurality of gear teeth 164 along its arcuate side for engagement with gear teeth 142 of spur gear 140. The short, opposite side of gear sector 160 includes a cylindrical groove 168 corresponding in size to latch pin 150. The radial sides of gear sector 160 are of a length so that gear sector 160 will pivot along cylindrical groove 168 about latch pin 150 as gear teeth 142 of spur gear 140 turn through gear teeth 164 of gear sector 160. Again, the distances between the centers of valve stem 116, latch pin 150 and upraised pin 132, together with the gear ratio of gear sector 160 and spur gear 140, determines the factor by which the force applied to operating lever 146 is increased.

Also disposed upon valve cap 122 is guide track 180 formed in guide track housing 182. Guide track housing 182 is secured to valve cap 122 using a plurality of bolts 186 threaded into mounting holes 128 in valve cap 122 after passing through mounting holes 184 in holder 182. At its end nearest latch pin 150, guide track 180 includes an extended stop 188 for engagement with guide ruler 190 disposed below gear sector 160. Guide roller 190 is free to rotate above enlarged, slotted head 194 of guide pin 192. In order to accommodate guide roller 190 in the fully closed position, operating arm 130 includes an appropriate recess 134. After engaging stop surface 188, guide roller 190 conveniently travels along guide track 180 locking gear sector 160 and operating arm 130 in fixed relative position.

Gear sector 160 further includes an elliptical mounting bore 162 for receiving upraised pin 132 of operating arm 130. Thus, movement of gear sector 160, i.e., rotation about latch pin 150 is translated into movement of operating arm 130, i.e., rotation about valve stem 116 via the connection of pin 132 and bore 162.

Figure 7:
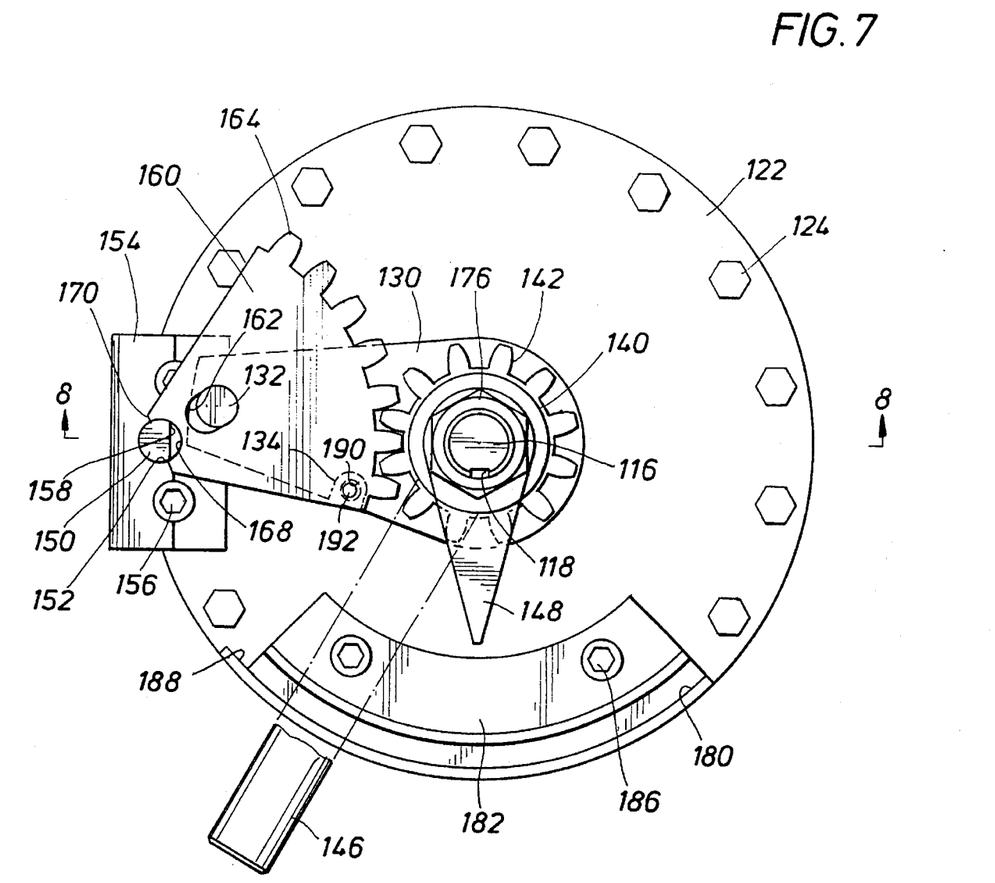
FIG. 7 is a top illustration of a valve actuator including an alternative embodiment of a torque reduction system in accord with the present invention and illustrates the system in the fully closed position wherein the gear sector and operating arm are engaged with the latch pin.
Figure 8:
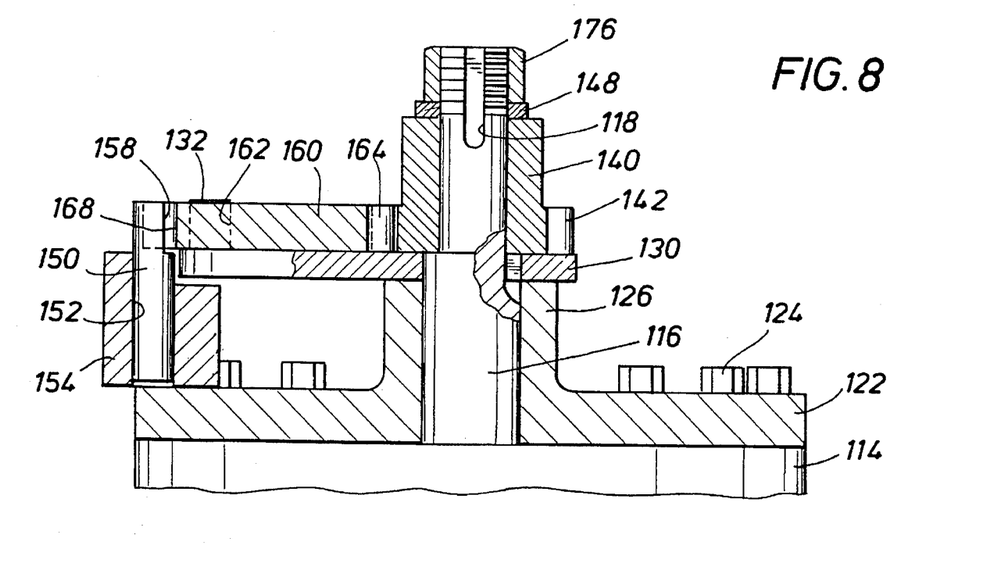
FIG. 8 is a side cross-sectional illustration through line 8—8 of FIG. 7 of the valve actuator including the alternative embodiment torque reduction system in accord with the present invention as shown in FIG. 7.
Figure 9:
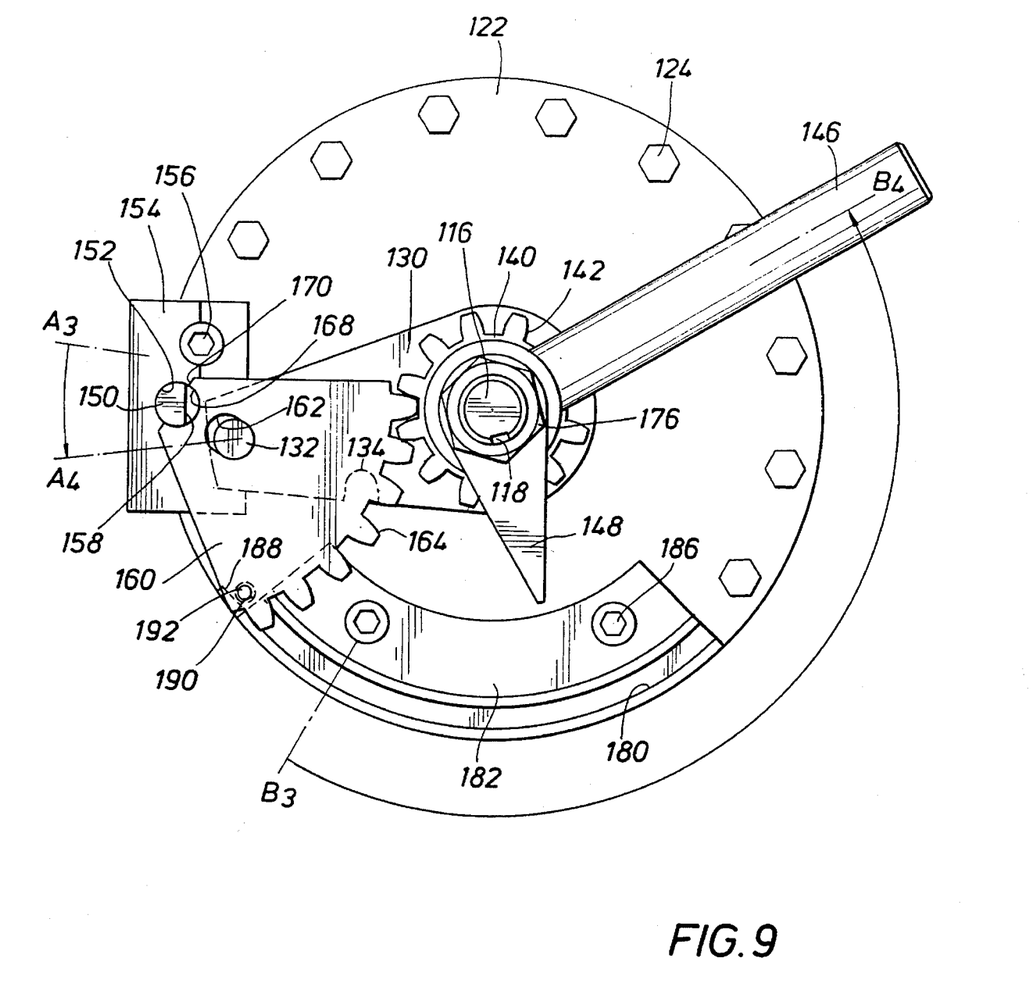
FIG. 9 is a top illustration of the valve actuator including an alternative embodiment of a torque reduction system in accord with the present invention as shown in FIG. 7 and illustrates the system after the valve has been initially opened so that the gear sector has been rotated about the latch pin.

The operation of the alternative embodiment of the torque reduction system of the present invention and the cooperation of the various elements is readily understandable by reference to FIGS. 7 and 9-11 illustrating the components in, respectively, the fully closed, initially opened and fully opened positions of a typical quarter-turn rotary valve. FIG. 7 illustrates the alternative embodiment of the torque reduction system of the present invention in the fully closed position. In the fully closed position operating arm 130 is disposed along radius $A_3$ while operating lever 146 is disposed along radius $B_3$, both subtended from valve stem 116. See FIG. 9. Initial application of force to operating lever 146 in the counter-clockwise direction is transmitted through spur gear 140 to gear sector 160. As operating lever 146 is rotated from position $B_3$ to position $B_4$, gear sector 160 is pivoted about latch pin 150, moving operating arm 130 from position $A_3$ to position $A_4$. Thus, while operating lever 146 has rotated approximately 180 degrees, operating arm 130 has rotated only about 20 degrees to initially open the valve. Further rotation of gear sector 160 about latch pin 150 is prevented by engagement of guide roller 190 with guide track stop 188. See FIG. 9. When operating lever 146 is rotated beyond position B4, gear sector 160 and operating arm 130 are rotated in locked position as guide roller 190 travels along guide track 180. Gear sector 160 is lifted off latch pin 150 as surface 170 of gear sector 160 clears the flattened face 158 of latch pin 150. Continued rotation of operating lever 146 brings the valve to the fully opened position illustrated in FIG. 10.

Figure 10:
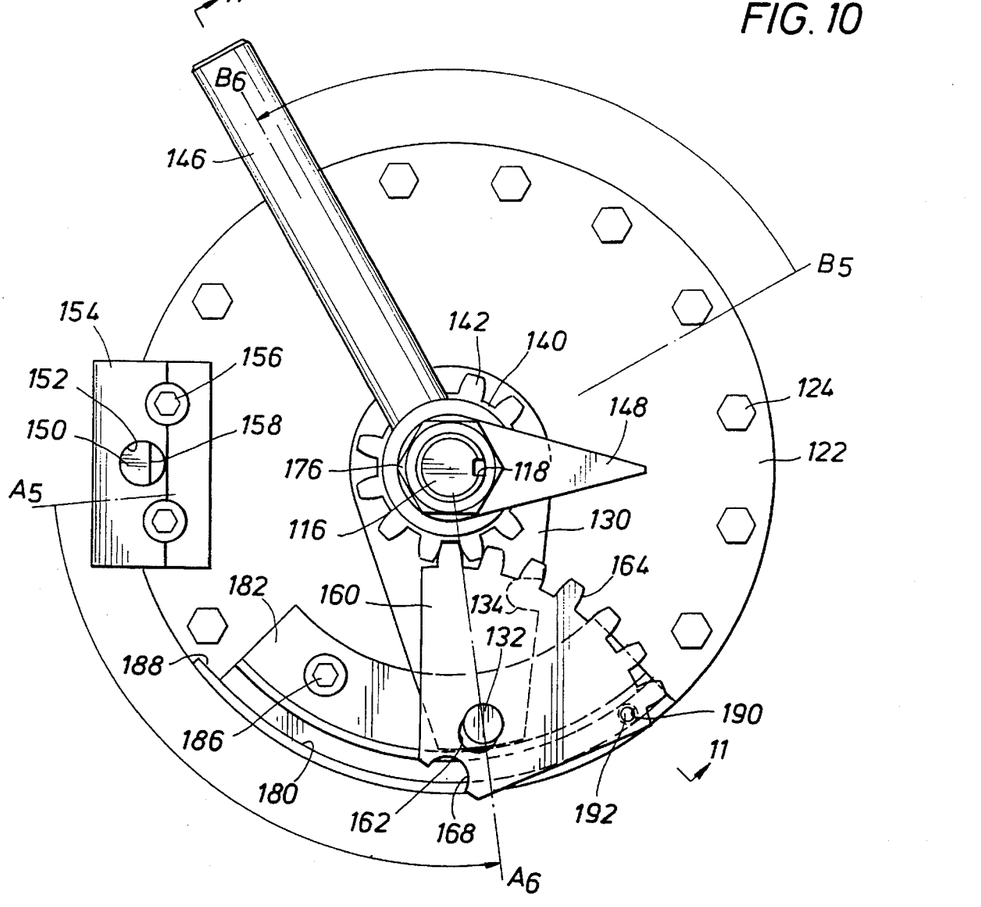
FIG. 10 is a top illustration of the valve actuator including an alternative embodiment of a torque reduction system in accord with the present invention as shown in FIG. 7 and illustrates the system after the valve has been fully opened so that the locked gear sector and operating arm have been rotated away from the latch pin.
Figure 11:
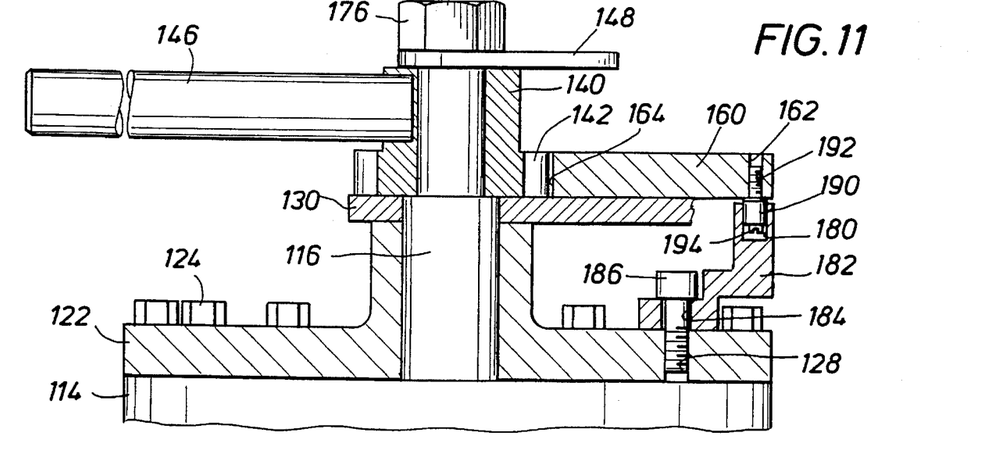
FIG. 11 is a cross-sectional illustration through line 11—11 of FIG. 10 illustrating the guide track and guide means of the locking means of the alternative embodiment of the present invention.

The fully opened valve illustrated in FIG. 10 may be closed by rotating operating lever 146 in the clockwise direction. Because guide roller 190 is firmly held within guide track 180, gear sector 160 and operating arm 130 remain locked until latch pin 150 is engaged by gear sector 160 in the position illustrated in FIG. 9. Further rotation of operating lever 146 in the clockwise direction causes gear sector 160 to rotate about latch pin 150 during which rotation guide roller 190 is freed from guide track 180 as gear sector 160 and operating arm 130 rotate from the position illustrated in FIG. 9 to that illustrated in FIG. 7.

The foregoing description of the invention has been directed in primary part to a particular preferred embodiment in accordance with the requirements of the patent statutes and for purposes of explanation and illustration. It will be apparent, however, to those skilled in the art that many modifications and changes in the specifically described system may be made without departing from the true spirit and scope of the invention. Exemplary of such modifications are the two different locking means which have been illustrated and described above. Therefore, the invention is not restricted to the preferred and alternative embodiments described but covers all modifications which may fall within the scope of the following claims.

What is claimed is:

1. A system for reducing the force which must initially be applied to an operating lever to actuate a quarter turn rotary valve from the fully closed position, said valve having a valve stem projecting from a valve housing, said system comprising:

a spur gear disposed and rotatable about, but not fixed to, said valve stem;

an operating lever fixed to said spur gear for rotating said spur gear about said valve stem;

a cylindrical latch pin fixed to said valve housing and disposed substantially parallel to said valve stem;

an operating arm keyed to and rotatable with said valve stem and including a cylindrical gear sector pin disposed substantially parallel to said valve stem;

a gear sector carried on said operating arm, said gear sector defined by first and second parallel sides connected by an arcuate side having gear teeth for engaging said spur gear, a latching side opposite said arcuate side and two radial sides connecting said arcuate side with said latching side, said gear sector including a cylindrical groove in said latching side corresponding to said latch pin and an elliptical bore in at least one of said parallel sides substantially parallel to said groove for receiving said gear sector pin whereby said gear sector is pivotable on said latching side about said latch pin so that rotation of said gear sector about said latch pin and said gear sector pin rotates said operating arm and said valve stem; and means operatively associated with said latch pin and said groove for locking and unlocking said operating arm and said gear sector so that in an unlocked position said valve stem is driven by said gear sector through rotation of said gear sector about said latch pin to rotate said operating arm whereby the force which must be applied to said operating lever is reduced and so that in a locked position said valve stem is driven by said spur gear through said gear sector and said operating arm which are fixed relative to one another.

2. The system of claim 1 wherein said locking means comprises a guide track fixed to said valve housing and a guide means carried on said gear sector, said guide means engageable with and movable along said guide track for maintaining said operating arm and said gear sector in a locked position relative to one another.

3. The system of claim 1 wherein said locking means comprises cooperating stop surfaces on said spur gear and said gear sector, together with a slidable locking key disposed in a keyway formed between said operating arm and said gear sector.

4. The system of claim 3 wherein said keyway is formed by a groove in said operating arm and a cooperating groove in one of said parallel sides of said gear sector, each said groove having at least one curved sidewall, said curved sidewall in said gear sector defined by a radius of curvature centered on the axis of said latch pin, said curved sidewall in said operating arm defined by a radius of curvature centered on the axis of said valve stem, and said slidable key having two opposite convex curved sides for cooperation with said curved sidewalls.

5. A system for reducing the force which must initially be applied to an operating lever to actuate a valve from the fully closed position, said valve having a valve stem projecting from a valve housing, said system comprising:

a spur gear disposed and rotatable about, but not fixed to, a valve stem;

an operating lever for rotating said spur gear;

an operating arm fixed to and rotatable with said valve stem;

a gear sector carried on and rotatable with respect to said operating arm for transferring the force applied to said operating lever and spur gear to said operating arm to rotate said valve stem;

a latch means including a groove for cooperating with said gear sector to define first and second positions whereby in said first position said operating arm and said valve stem are turned through relative rotation of said gear sector and said operating arm so that the force which must applied to said operating lever is reduced and in said second position said operating arm and said valve stem are turned while said gear sector and operating arm remain fixed relative to one another; and means operatively associated with said latch means for alternately locking said gear sector and said operating arm in said first and second positions.

6. A system for reducing the force which must initially be applied to an operating lever to actuate a valve from the fully closed position, said valve having a valve stem projecting from a valve housing, said system comprising:

a spur gear disposed and rotatable about, but not fixed to, said valve stem;

an operating lever for rotating said spur gear;

a latch pin fixed to said valve housing;

an operating arm fixed to and rotatable with said valve stem and including a gear sector pin;

a gear sector carried on said operating arm and rotatable about said gear sector pin, said gear sector defined by first and second parallel sides connected by an arcuate side having gear teeth for engaging said spur gear, a latching side opposite said arcuate side and two radial sides connecting said arcuate side with said latching side, said gear sector pivotable on said latching side about said latch pin and rotatable about said gear sector pin whereby rotation of said gear sector about said latch pin and said gear sector pin rotates said operating arm and said valve stem; and means operatively associated with said latch pin for locking and unlocking said operating arm and said gear sector so that in an unlocked position said valve stem is driven by said spur gear through rotation of said gear sector about said latch pin to rotate said operating arm whereby the force which must be applied to said operating lever is reduced and so that in a locked position said valve stem is driven by said spur gear through said gear sector and said operating arm which are fixed relative to one another.

7. The system of claim 6 wherein said locking means comprises a guide track fixed to said valve housing and a guide means carried on said gear sector, said guide means engageable with and movable along said guide track for maintaining said operating arm and said gear sector in a locked position relative to one another.

8. The system of claim 7 wherein said guide means is a roller disposed on a guide pin projecting from said gear sector and substantially parallel to said valve stem.

9. The system of claim 6 wherein said locking means comprises cooperating stop surfaces on said spur gear and said gear sector.

10. The system of claim 9 wherein said locking means further comprises a slidable locking key disposed in a keyway formed between said operating arm and said gear sector.

11. The system of claim 10 wherein said keyway is formed by a slot in said operating arm and a cooperating slot in one of said parallel sides of said gear sector, each said slot having at least one curved sidewall, and said slidable locking key having two opposite convex curved surfaces for cooperation with said curved sidewalls.

12. The system of claim 11 wherein said curved sidewall in said gear sector is defined by a radius of curvature centered on the axis of said latch pin and said curved sidewall in said operating arm is defined by a radius of curvature centered on the axis of said valve stem.

13. The system of claim 10 wherein said locking means further comprises a means for biasing said slidable locking key toward said unlocked position.

14. The system of claim 6 wherein said latch pin is a cylindrical pin disposed substantially parallel to said valve stem and said opposite side of said gear sector includes a corresponding cylindrical groove to pivot about said cylindrical pin.

15. The system of claim 14 wherein said latch pin further comprises a flat surface facing said valve stem around which said cylindrical groove can move to lock and unlock said locking means.

16. The system of claim 14 wherein said gear sector pin comprises a cylindrical connecting pin projecting from said operating arm substantially parallel to said valve stem and said gear sector further comprises a substantially elliptical bore in at least one of said parallel sides for receiving said connecting pin.

17. The system of claim 6 wherein said operating arm is keyed to said valve stem.

18. The system of claim 6 further comprising a position indicator fixed to and rotatable with said valve stem for indicating the position of said valve between its open and closed positions.

19. The system of claim 6 wherein said arcuate side is less than about 90 degrees.

20. The system of claim 6 wherein said valve is a rotary valve.

* * * * *